United States Patent
Zhang et al.

(10) Patent No.: US 12,433,625 B2
(45) Date of Patent: Oct. 7, 2025

(54) THREE-ARM CLAMP

(71) Applicants: MICRO-TECH (NANJING) CO., LTD., Jiangsu (CN); Qiang Zhang, Guangdong (CN)

(72) Inventors: Qiang Zhang, Guangdong (CN); Hongyan Jin, Jiangsu (CN); Changqing Li, Jiangsu (CN); Zhenghua Shen, Jiangsu (CN); Xiaojun Ma, Jiangsu (CN); Weiqin Qiu, Jiangsu (CN); Hao Dong, Jiangsu (CN)

(73) Assignees: MICRO-TECH (NANJING) CO., LTD., Jiangsu (CN); Qiang Zhang, Guangdog (CN)

( * ) Notice: Subject to any disclaimer, the term of this patent is extended or adjusted under 35 U.S.C. 154(b) by 431 days.

(21) Appl. No.: 17/981,003

(22) Filed: Nov. 4, 2022

(65) Prior Publication Data

US 2023/0057353 A1     Feb. 23, 2023

Related U.S. Application Data

(63) Continuation-in-part of application No. PCT/CN2021/088489, filed on Apr. 20, 2021.

(30) Foreign Application Priority Data

May 9, 2020 (CN) ......................... 202010390270.3

(51) Int. Cl.
*A61B 17/29* (2006.01)
*A61B 17/00* (2006.01)

(52) U.S. Cl.
CPC .... *A61B 17/29* (2013.01); *A61B 2017/00862* (2013.01); *A61B 2017/2936* (2013.01); *A61B 2017/2947* (2013.01)

(58) Field of Classification Search
CPC ......... A61B 17/29; A61B 17/08; A61B 17/10; A61B 17/122; A61B 17/1285;
(Continued)

(56) References Cited

U.S. PATENT DOCUMENTS 5,228,451 A * 7/1993 Bales ...................... A61B 10/06
606/205
12,121,254 B2 * 10/2024 Tang ...................... A61B 17/10
(Continued)

FOREIGN PATENT DOCUMENTS

CN    103989500 A    8/2014
CN    107115130 A    9/2017
(Continued)

OTHER PUBLICATIONS

English Abstract for CN111481304 retrieved on Espacenet on Oct. 25, 2022.
(Continued)

*Primary Examiner* — Shaun L David
*Assistant Examiner* — Rachael L Geiger
(74) *Attorney, Agent, or Firm* — BCF LLP

(57) ABSTRACT

Three-arm clamp includes: clamping assembly and releasing member connected to each other, clamping assembly includes fixed arm, and two movable arms respectively rotatably connected to fixed arm by hinge pin; the proximal end of each movable arm is provided with first sliding slot, and sliding pin is slidably arranged in first sliding slot; the proximal end of fixed arm is provided with inner cavity, and releasing member is inserted into inner cavity and connected to sliding pin; the proximal end of each movable arm is provided with elastic sheet; movable arms and fixed arm are closed by clamping, and elastic sheets are folded in inner cavity, in radial direction of fixed arm, from connecting end to free end and abut against releasing member; and releasing
(Continued)

member is separated from movable arms, and the free end of each elastic sheet elastically abuts against inner wall of inner cavity.

12 Claims, 8 Drawing Sheets

(58) Field of Classification Search
CPC . A61B 17/083; A61B 17/046; A61B 17/2812; A61B 17/2816; A61B 17/282; A61B 2017/00862; A61B 2017/2936; A61B 2017/2947; A61B 2017/00477; A61B 2017/00818; A61B 2017/2916; A61B 2017/2917; A61B 2017/2933; A61B 2017/301; A61B 2017/2808; A61B 2017/2825; A61B 2017/2829; A61B 2017/0495; A61B 2017/07292; A61B 2017/2926; A61B 2017/2938; A61B 2090/034; A61B 90/02
See application file for complete search history.

(56) References Cited

U.S. PATENT DOCUMENTS

| | | | | |
|---|---|---|---|---|
| 2008/0319455 | A1* | 12/2008 | Harris | A61B 17/0684 606/139 |
| 2013/0066318 | A1* | 3/2013 | Kerr | A61B 18/085 606/171 |
| 2013/0226199 | A1* | 8/2013 | Harris | A61B 17/10 606/142 |
| 2014/0025071 | A1* | 1/2014 | Sims | A61B 18/1482 606/46 |
| 2015/0080916 | A1* | 3/2015 | Aranyi | A61B 17/1285 606/143 |
| 2016/0367258 | A1* | 12/2016 | Jin | A61B 17/1285 |
| 2017/0209143 | A1* | 7/2017 | Chen | A61B 90/03 |
| 2019/0223875 | A1 | 7/2019 | Saenz Villalobos et al. | |
| 2022/0054156 | A1* | 2/2022 | Tang | A61B 17/1285 |
| 2022/0133326 | A1* | 5/2022 | Yu | A61B 17/1285 606/157 |

FOREIGN PATENT DOCUMENTS

| | | |
|---|---|---|
| CN | 107684448 A | 2/2018 |
| CN | 109805986 A | 5/2019 |
| CN | 109953800 A | 7/2019 |
| CN | 110251186 A | 9/2019 |
| CN | 209884245 U | 1/2020 |
| CN | 111481304 A | 8/2020 |
| CN | 212466192 U | 2/2021 |

OTHER PUBLICATIONS

English Abstract for CN212466192 retrieved on Espacenet on Oct. 25, 2022.
English Abstract for CN109953800 retrieved on Espacenet on Oct. 25, 2022.
English Abstract for CN107115130 retrieved on Espacenet on Oct. 25, 2022.
English Abstract for CN110251186 retrieved on Espacenet on Oct. 25, 2022.
English Abstract for CN107684448 retrieved on Espacenet on Oct. 25, 2022.
English Abstract for CN109805986 retrieved on Espacenet on Oct. 25, 2022.
English Abstract for CN209884245 retrieved on Espacenet on Oct. 25, 2022.
English Abstract for CN103989500 retrieved on Espacenet on Oct. 25, 2022.
International Search Report and Written Opinion (and English Translation) with regard to the PCT/CN2021/088489 mailed Jul. 21, 2021.

* cited by examiner

THREE-ARM CLAMP

CROSS-REFERENCE

The present application is a Continuation-in-Part of PCT/CN2021/088489, filed Apr. 20, 2021, entitled "THREE-ARM CLAMP", which claims priority to Chinese Patent Application No. 202010390270.3 filed on May 9, 2020, entitled "THREE-ARM CLAMP"; the entirety of each of which is incorporated herein by reference in their entirety.

FIELD

The present disclosure relates to the technical field of endoscopic medical devices, and specifically to a three-arm clamp.

BACKGROUND

With the development of endoscopic minimally invasive technologies, some digestive tract diseases, such as early digestive tract tumors, which require surgical laparotomy or laparoscopic treatment, can be treated by a digestive endoscopic minimally invasive surgery. In the process of endoscopic minimally invasive surgery, the suturing of digestive tract mucosal defects, including digestive tract bleeding and perforation, is the most common problem to be processed in surgery.

Currently, defect suturing instruments mainly used in endoscopic minimally invasive surgery include: endoscopic clips, nylon rope combined with metal clips (purse-string), endoscopic suturing devices (such as OTSC), suturing instruments for surgical suture (such as Overstitch), and the like. The endoscope clip is simple to use and inexpensive, but can hardly repair large defects or defects at a site difficult to operate; the nylon rope combined with metal clips for suturing can treat a large wound surface in one go, but there are risks that the wound surface cannot be completely closed and the metal clips fall into the wound surface during the suturing, which brings inconvenience to the operation; the endoscopic suturing device can provide a relatively large closing force, and can also perform full-layer suturing for a wound surface such as perforation, but the wound surface treated thereby is usually less than 10 mm, only one time of suturing can be performed by one time of endoscope entering, and the assembling operation of the instrument and the endoscope is relatively complex, and requires prior training to use; and the suturing instruments for surgical suture have their unique advantages as representative instruments for suture suturing, but the instruments are complicated in both structure and operation, and need specialized training and long-term practical operation to be mastered.

SUMMARY

An objective of the present disclosure lies in providing a three-arm clamp, which can simply, quickly, and effectively carry out clamping and suturing of a large defect of the digestive tract and a defect at a site difficult to operate in an endoscopic minimally invasive surgery.

Embodiments of the present disclosure are realized as follows.

An embodiment of the present disclosure provides a three-arm clamp, including: a clamping assembly and a releasing member connected to each other, the clamping assembly includes a fixed arm and two movable arms respectively rotatably connected to the fixed arm through a hinge pin, a first sliding slot is provided at a proximal end of each movable arm, a sliding pin is slidably provided in the first sliding slot, an inner cavity is formed at a proximal end of the fixed arm, the releasing member is inserted into the inner cavity and connected to the sliding pin, an elastic sheet is further provided at the proximal end of the movable arms; when the movable arms clamp and are closed with the fixed arm, the elastic sheet is gradually folded in the inner cavity and abuts against the releasing member; in the above, a connecting end of the elastic sheet first enters the inner cavity until a free end of the elastic sheet also completely enters the inner cavity, and in the clamping and closed state of the movable arms and the fixed arm, the releasing member is separated from the sliding pin, the elastic sheet releases part of accumulated elastic potential energy, so that the free end of the elastic sheet releases part of compression amount and elastically abut against an inner wall of the inner cavity.

Optionally, a clamp holder is further provided at the proximal end of the fixed arm, the inner cavity is formed between the clamp holder and the fixed arm, the releasing member is separated from the movable arms, and the free end of the elastic sheet elastically abuts against an inner wall of the clamp holder.

Optionally, the elastic sheet is perpendicular to a longitudinal direction of the movable arms, the elastic sheet has one end connected to the proximal end of the movable arm, and the other end rises upwards towards a side away from the fixed arm in the free state, and when the movable arms are rotated along the hinge pin to clamp and be closed with the fixed arm, the elastic sheet is folded in the inner cavity of the clamp holder along a radial direction of the clamp holder and abuts against the releasing member, so that the elastic sheet is folded in the inner cavity of the clamp holder or reduces the friction when being extended out, and moves smoothly.

Optionally, a locking portion extending inwards is formed on an outer edge of the clamp holder, the releasing member is separated from the movable arms, the elastic sheet releases part of the accumulated elastic potential energy to spring towards the direction of the clamp holder, until the free end of the elastic sheet abuts against the locking portion, and the locking portion limits the movement of the elastic sheet by being perpendicular to a movement direction of the elastic sheet, thus ensuring the locking of a clamping position of the elastic sheet.

Optionally, the clamp holder is of a cylindrical structure, a slot for the movable arms to pass through is formed on the clamp holder, and the locking portion is formed on a side wall of the slot, thus the locking portion can be formed with the cylindrical structure of the clamp holder, so that the three-arm clamp has a compact overall structure, and the smoothness of the whole three-arm clamp is improved, facilitating the operations in the body.

Optionally, grooves are formed at two sides of the proximal end of the fixed arm, and the clamp holder is connected with the fixed arm through the grooves. The spaces of existing structures are fully utilized, so that the three-arm clamp of the embodiments of the present disclosure has a compact structure.

Optionally, a second sliding slot is provided on the fixed arm, and the second sliding slot is a strip-shaped slot. A longitudinal direction of the second sliding slot is the same as a movement direction of the releasing member, the sliding pin is provided to extend into the second sliding slot and slides in the second sliding slot, and the second sliding slot can guide the movement of the sliding pin, moreover, while sliding in the second sliding slot, the sliding pin also slides in the first sliding slot and drives the opening and closing movement of the movable arms. The first sliding slot includes an arc-shaped section and a tail section in communication with each other. The first sliding slot and the second sliding slot form a wedge relationship during the movement, so that it is more labor-saving to pull the sliding pin through the releasing member to control the opening and closing of the movable arms.

Optionally, a sliding pin cap is provided at one end of the sliding pin located in the second sliding slot, the diameter of the sliding pin cap is matched with the width of the second sliding slot so as to slide in the second sliding slot, and the sliding pin slides in the first sliding slot. The width of the second sliding slot is greater than that of the first sliding slot. The sliding pin cap that fits and slides in the second sliding slot cannot axially penetrate through the first sliding slot due to a larger plane width thereof, thus providing structural limitation for an axial movement of the sliding pin, and improving the movement stability of the sliding pin.

Optionally, the releasing member includes a releasing lever and a releasing portion connected to a distal end of the releasing lever, a connection hole is formed in the releasing portion, a detachment portion is formed between the connection hole and the distal end of the releasing portion, the releasing member is connected to the sliding pin through the connection hole. The releasing member is located on a side of the movable arm away from the fixed arm. After the two movable arms of the clamp assembly both accurately clamp and are closed with the fixed arm, by directly pulling the releasing member continuously, the sliding pin can be detached from the connection hole through the detachment portion, thus the releasing member is separated. The process of separating the releasing member only requires withdrawing the releasing member towards the proximal direction along the movement direction of the releasing member without any lateral operation, thus saving the lateral dimension space of the three-arm clamp of the embodiments of the present disclosure, and facilitating the miniaturization and compact design of the structure.

Optionally, a sliding pin sleeve is fixedly provided on the sliding pin, and a diameter of the sliding pin sleeve is greater than an aperture of the connection hole on the releasing portion. Due to the limitation of the sliding pin sleeve, the releasing portion will not be axially displaced during the movement, and the movement stability of the releasing member can be effectively improved.

Optionally, a retainer is further coupled in the inner cavity, and the retainer includes an annular portion and at least two claws extending outwards from the annular portion, the claws are elastically coupled with the inner wall of the inner cavity, the proximal end of the releasing member is inserted into the annular portion, and the separation of the releasing members from the movable arms can drive the retainer to be separated and retracted. In an operating process of controlling the movable arms and the fixed arm of the clamping assembly to be opened and closed with each other through the releasing member so as to clamp a target object, two releasing levers of the movable arms at two side are respectively controlled to have a telescopic movement in the annular portion, and the annular portion can restrict a movement direction of the releasing member, so that the releasing member has better straightness during the movement, and after the clamping of the target object is completed, the releasing member separated from the movable arms are retracted towards the proximal direction. Generally, the width of the releasing member is set to be greater than the inner diameter of the annular portion, then in the process of retracting the releasing member, the claws of the retainer can be driven to separate from the elastic coupling with the clamp holder, and retracted together with the releasing member.

Optionally, the three-arm clamp of the embodiments of the present disclosure further includes a handle assembly, the handle assembly includes a handle bracket and two handle sliders provided at two sides of the handle bracket and respectively slidable on the handle bracket, the proximal end of the releasing member is connected to an operating wire, and the two handle sliders are correspondingly connected to proximal ends of the operating wires at the same side, respectively. When the three-arm clamp of the embodiments of the present disclosure is applied to endoscopic surgery, the handle assembly is operated outside the body, connected to an operation part entering the body through the operating wire and controls the operation, and after the clamping operation in the body is completed, a part at the distal end other than clamping assembly is withdrawn from the body through the control of the handle assembly.

Optionally, the proximal end of the fixed arm is connected to one end of a spring tube, the other end of the spring tube is connected to the handle bracket, and the operating wires are provided in the spring tube. The spring tube itself has a certain flexible telescopic and bending capability, and by guiding the introduction or extraction of the operating wires into or out of the body through the spring tube, the operation difficulty can be reduced, and the spring tube can protect the operating wires.

The embodiments of the present disclosure include the following beneficial effects.

The embodiments of the present disclosure provide a three-arm clamp, including: a clamping assembly and a releasing member connected to each other, the clamping assembly includes a fixed arm and two movable arms respectively rotatably connected to the fixed arm through a hinge pin, a first sliding slot is provided at a proximal end of each movable arm, a sliding pin is slidably provided in the first sliding slot, an inner cavity is provided at a proximal end of the fixed arm, the releasing member is inserted into the inner cavity and connected to the sliding pin, and the releasing member continues to be pushed towards a distal end along a direction in which the releasing member is inserted, each movable arm is driven to rotate with the hinge pin as a center through the movement of the sliding pin along with the releasing member towards the distal end and the sliding of the sliding pin in the first sliding slot, and the distal end of the movable arm is opened relative to the fixed arm. After a target object is confirmed, the releasing member is pulled towards the proximal direction, and the sliding pin moves towards the proximal direction along with the releasing member and slides in the first sliding slot, to drive the movable arms to rotate, and the distal ends of the movable arms are closed towards the fixed arm so as to clamp the target object. An elastic sheet is further provided at the proximal ends of the movable arms, and when the movable arms are rotated along the hinge pin to clamp and be closed with the fixed arm, the elastic sheet is gradually folded in the inner cavity and abuts against the releasing member; in the above, as the distal ends of the movable arms approach the fixed arm, a connecting end of the elastic sheet first enters the inner cavity until the distal ends of the movable arms clamp and are closed with the fixed arm, the free end of the elastic sheet also completely enters the inner cavity, and the free end of the elastic sheet abuts against a surface of the releasing member. After the movable arms at two sides are respectively controlled to clamp the target object, the releasing member is separated from the sliding pin, the releasing member can be folded through the proximal end, the free end of the elastic sheet is separated from the abutment against the surface of the releasing member, and after releasing part of accumulated elastic potential energy, elastically abuts against the inner wall of the inner cavity. The elastic abutment of the elastic sheet against the inner wall of the inner cavity effectively ensures stability of clamping and fixing between the fixed arm and the movable arms in the part of the clamping assembly left in the body after the operation is completed.

BRIEF DESCRIPTION OF DRAWINGS

In order to more clearly illustrate the technical solutions of embodiments of the present disclosure, accompanying drawings which need to be used in the embodiments will be introduced below briefly, and it should be understood that the accompanying drawings below merely show some embodiments of the present disclosure, and therefore should not be considered as limitation to the scope, and a person ordinarily skilled in the art still could obtain other relevant accompanying drawings according to these accompanying drawings, without any inventive effort.

Figure 1:
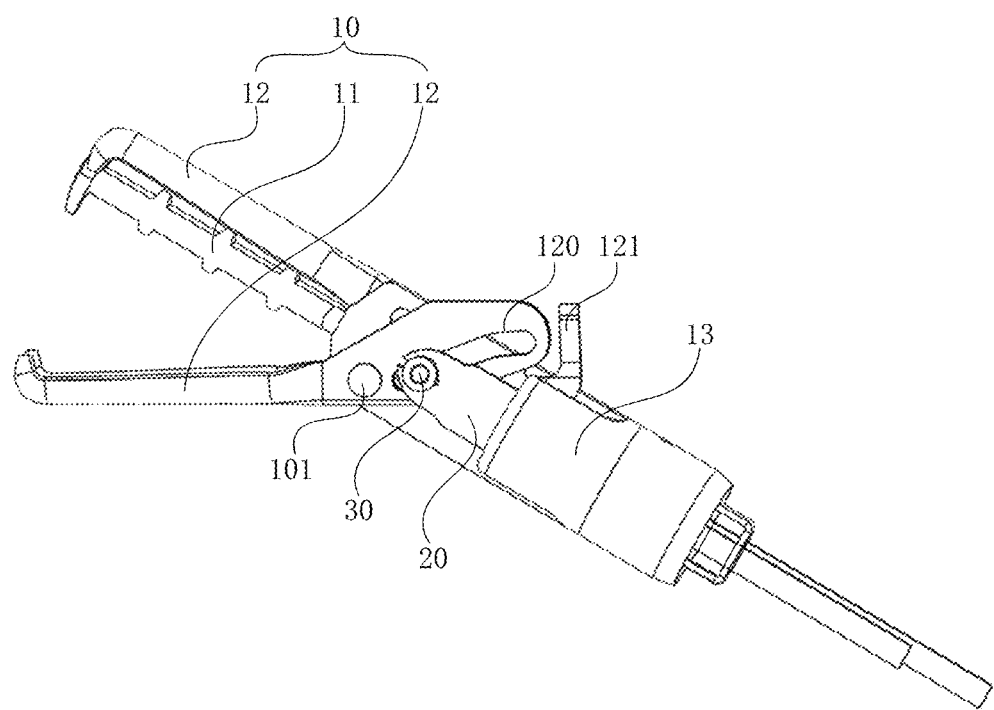
FIG. 1 is a first structural schematic view of a three-arm clamp provided in an embodiment of the present disclosure.

Reference signs: 10—clamping assembly; 101—hinge pin; 11—fixed arm; 110—groove; 111—second sliding slot; 12—movable arm; 120—first sliding slot; 121—elastic sheet; 13—clamp holder; 130—slot; 131—locking portion; 20—releasing member; 21—releasing lever; 22—releasing portion; 220—connection hole; 221—detachment portion; 30—sliding pin; 31—sliding pin cap; 32—sliding pin sleeve; 40—retainer; 41—annular portion; 42—claw; 50—handle assembly; 51—handle bracket; 52—handle slider; 60—spring tube; 70—operating wire; A, B, C—arrow coordinate direction; T—partially enlarged region.

DETAILED DESCRIPTION

In order to make objectives, technical solutions, and advantages of the embodiments of the present disclosure clearer, the technical solutions in the embodiments of the present disclosure will be described clearly and completely below in conjunction with the accompanying drawings in the embodiments of the present disclosure, and apparently, some but not all embodiments of the present disclosure are described. Generally, components in the embodiments of the present disclosure described and shown in the accompanying drawings herein may be arranged and designed in different configurations.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be noted that the orientation or positional relationship indicated by the terms "center", "upper", "lower", "inner", "outer", etc. are based on the orientation or positional relationship shown in the drawings, or the orientation or positional relationship in which the product is usually placed in use. It is only for the convenience of describing the present disclosure and simplifying the description, rather than indicating or implying that the mentioned device or element must be in a specific orientation, or constructed or operated in a specific orientation, and therefore it cannot be understood as a limitation to the present disclosure. Besides, terms such as "first", "second", and "third" are merely for distinctive description, but should not be construed as indicating or implying importance in the relativity.

In the description of the present disclosure, it should be further illustrated that, unless otherwise specifically regulated and defined, the terms "set", "join", and "connect" should be understood in a broad sense, for example, a connection may be a fixed connection, a detachable connection, or an integrated connection; it may be a mechanical connection or an electrical connection; it may be direct joining or indirect joining through an intermediary, and it also may be inner communication between two elements. For those ordinarily skilled in the art, the specific meanings of the above-mentioned terms in the present disclosure can be understood in specific situations.

Those skilled in the art could understand that a three-arm clamp of an embodiment of the present disclosure can be used in endoscopic surgery, and when applied in endoscopic surgery, the three-arm clamp includes a distal part which is extended into a human body to perform operations such as clamping, and a proximal part which is operated by a doctor outside the body. Therefore, in contrast, in the embodiments of the present disclosure, for the three-arm clamp as a whole and each part thereof, a side close to the operations in the body is called as a distal end, and a side close to the doctors' operations is called as a proximal end.

FIG. 1 is a first structural schematic view of the three-arm clamp provided in an embodiment of the present disclosure. Referring to FIG. 1, an embodiment of the present disclosure provides a three-arm clamp, including: a clamping assembly 10 and a releasing member 20 connected to each other, the clamping assembly 10 includes a fixed arm 11 and two movable arms 12 respectively rotatably connected to the fixed arm 11 through a hinge pin 101, a first sliding slot 120 is provided at a proximal end of each movable arm 12, and a sliding pin 30 is slidably provided in the first sliding slot 120, an inner cavity is further provided at the proximal end of the fixed arm 11, the releasing member 20 is inserted into the inner cavity and connected to the sliding pin 30, a distal end of each movable arm 12 can be opened and closed with the fixed arm 11 under the control of extension and retraction of the releasing member 20, and an elastic sheet 121 is further provided at the proximal end of the movable arms 12; when the movable arms 12 are rotated along the hinge pin 101 to clamp and be closed with the fixed arm 11, the elastic sheet 121 is gradually folded in the inner cavity and abuts against the releasing member 20; in the above, a connecting end of the elastic sheet 121 first enters the inner cavity until a free end of the elastic sheet 121 also completely enters the inner cavity, and in the clamping and closed state of the movable arms 12 and the fixed arm 11, the releasing member 20 is separated from the sliding pin 30, the elastic sheet 121 releases part of accumulated elastic potential energy, so that the free end of the elastic sheet 121 releases part of compression amount and elastically abuts against an inner wall of the inner cavity.

The three-arm clamp of the embodiments of the present disclosure is usually applied to a surgical operation through an endoscope, for a clamping operation of a part to be sutured in a body, especially a clamping operation for suturing a large-area wound or distant positions.

Figure 2:
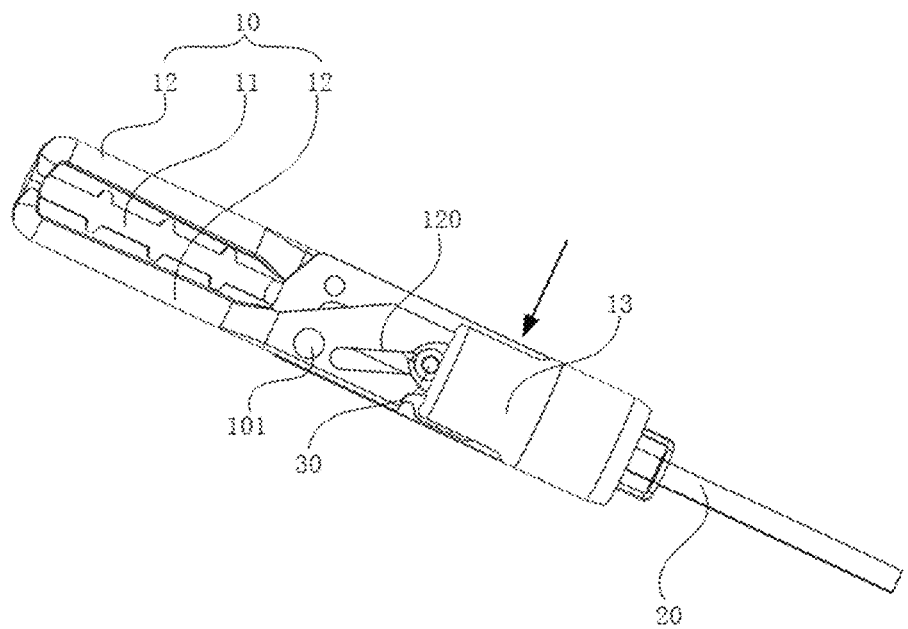
FIG. 2 is a second structural schematic view of the three-arm clamp provided in an embodiment of the present disclosure.

In the three-arm clamp of the embodiments of the present disclosure, the clamping assembly 10 and the releasing member 20 connected to each other as shown in FIG. 1 are both extended into the patient. FIG. 1 shows a view that the fixed arm 11 and the movable arms 12 in the clamping assembly 10 are in an opened state, at this time, the whole clamping assembly 10 can be controlled to move, so that tissue structures of a site to be clamped or a wound edge are located between the opened fixed arm 11 and movable arms 12. When the tissue structures at the wound edge are confirmed to be located between the opened fixed arm 11 and movable arms 12, the releasing member 20 is pulled linearly towards the proximal direction. The releasing member 20 is connected to the sliding pin 30. As the releasing member 20 retreats, the sliding pin 30 is driven to retreat, and while the sliding pin 30 slides in the first sliding slot 120, due to the movement of position of the sliding pin 30, the movable arms 12 are also driven to rotate, and both the proximal end and the distal end of each movable arm 12 approach the proximal end and the distal end of the fixed arm 11 respectively. When the sliding pin 30 slides to a position close to a terminal end of the proximal end of the first sliding slot 120, the movable arms 12 are rotated to clamp and be closed with the fixed arm 11, at this time, the tissue structures at the wound edge have been clamped and fixed between the movable arms 12 and the fixed arm 11. FIG. 2 is a second structural schematic view of the three-arm clamp provided in the present disclosure, and as shown in FIG. 2, it is a closed state. At this time, the position of the whole clamping assembly 10 may be moved again, if needed, to a position that needs to be sutured to the tissue structures at the wound edge, the movable arm 12 at the other side is opened in the same way to clamp and then close the position, in this way, the structures that need to be sutured to each other are clamped and fixed together by the three-arm clamp of the embodiments of the present disclosure from two separated places, at this time, suturing through a suturing device under an endoscope can reduce the difficulty of operation, and effectively improve the suturing effect.

Figure 3:
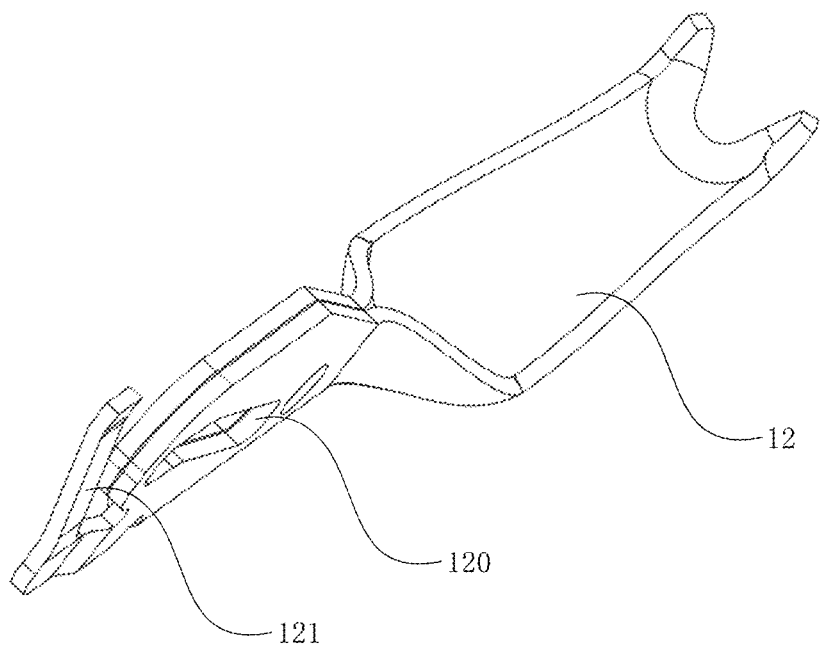
FIG. 3 is a structural schematic view of a movable arm of the three-arm clamp provided in an embodiment of the present disclosure.

In the above, as shown in FIG. 1, when the movable arms 12 and the fixed arm 11 are in the opened state, the elastic sheet 121 connected to and provided at the proximal end of each movable arm 12 is also in a free state away from a clamp holder 13. FIG. 3 is a structural schematic view of the movable arm 12 in the three-arm clamp of an embodiment of the present disclosure. It can be seen from FIG. 3 that when the elastic sheet 121 is in the free state, the free end of the elastic sheet 121 rises upwards and is higher than a rotation plane of the movable arm 12. Referring to the opened and closed state views of FIG. 1 and FIG. 2 in combination again, as shown in FIG. 1, the inner cavity covers at least the proximal end position of the fixed arm 11, when the releasing member 20 is controlled to move towards the proximal direction, the movable arm 12 at one side correspondingly controlled by the releasing member 20 is rotated therewith, and changes from the opened state in FIG. 1 to the closed state in FIG. 2, the elastic sheet 121 is gradually folded into the clamp holder 13 from the connecting end thereof connected to the movable arm 12 to the free end, as shown in FIG. 2. As the releasing member 20 is inserted into the inner cavity and connected to the sliding pin, the releasing member 20 is located outside the movable arm 12, and when the movable arm 12 is gradually folded into the inner cavity, the free end of the elastic sheet 121 is gradually deformed and compressed and then abuts against a surface of the releasing member 20.

Without doubt, in the above surgical operation, considering that the clamping of the tissue structures at the wound edge probably will not be completed at one time, re-clamping may be involved after one time of inaccurate clamping, or after clamping and suturing at one site, the clamped site needs to be released, to clamp and suture another site again, the above opening and closing of the movable arms 12 and the fixed arm 11 can be repeated a plurality of times under the control of the releasing member 20. Moreover, the magnitude of an opening angle of the movable arms 12 relative to the fixed arm 11 can be adjusted adaptively according to needs, for example, being adjusted by setting the shape and length of the first sliding slot 120, or possibly being finely adjusted by adjusting setting positions of the hinge pin 101 on the movable arms 12 and the fixed arm 11. When the fixed arm 11 and the movable arms 12 in a clamping state need to be expanded, it is only required to push the releasing member 20 to move linearly towards the distal end, the elastic sheet 121 on the movable arms 12 merely abuts against a plane of the releasing member 20 through the free end, and the abutment state does not affect the operation of pushing the movable arms 12 to rotate and open.

After the clamping operation of the three-arm clamp of the embodiments of the present disclosure in the patient is completely accomplished, the clamping state of the clamping assembly 10 further needs to be locked, and the releasing member 20 and the clamping assembly 10 needs to be disconnected, so that the releasing member 20 is withdrawn through a surgical portal, and the clamping assembly 10 remains in the body to meet the clamping requirement. According to the three-arm clamp of the embodiments of the present disclosure, after the releasing member 20 and the sliding pin 30 are disconnected, and the releasing member 20 is withdrawn from the inner cavity, the free end of the elastic sheet 121 originally abutting against the releasing member 20 loses an abutting force, then releases part of the accumulated elastic potential energy. The free end of the elastic sheet 121 releases part of the compressed amount and rises upwards, and elastically abuts against the inner wall of the inner cavity. In this way, due to the restriction of an inner wall edge of the inner cavity, a position of the elastic sheet 121 is abutted and limited, thus ensuring the clamping stability of the clamping assembly 10 after the releasing member 20 is withdrawn.

It should be noted that, first, in the three-arm clamp of the embodiments of the present disclosure, the fixed arm 11 and the movable arms 12 are rotatably connected through the hinge pin 101, wherein the hinge pin 101 refers to a generalized rotating shaft, as long as the fixed arm 11 and the movable arms 12 provided thereon can be rotated relative to each other with the hinge pin 101 as a center, and a specific structural form of the hinge pin 101 is not limited and required in the embodiments of the present disclosure. By the same reasoning, in the three-arm clamp of the embodiments of the present disclosure, a specific shape structure of the sliding pin 30 slidably provided in the first sliding slot 120 is not defined, either, the sliding pin 30 is slidably provided in the first sliding slot 120, and is connected to the distal end of the releasing member 20. As the hinge pin 101 has a certain distance from the first sliding slot 120, pulling the releasing member 20 to make the sliding pin 30 move in the first sliding slot 120 is equivalent to pulling each movable arm 12 from the proximal end of the movable arm 12, so that the movable arm 12 is rotated relative to the fixed arm 11 along the hinge pin 101, and the distal end of the movable arm 12 and the distal end of the fixed arm 11 are opened and closed under rotation. In this process, as it is difficult to avoid change of angle between the releasing member 20 and the movable arm 12, when the change of angle occurs between the two, corresponding rotation angle of the sliding pin 30 in the first sliding slot 120 is sufficient. Therefore, as long as the sliding pin 30 meets the conditions required by the above motion operation, the embodiments of the present disclosure do not specifically limit other structural features of the sliding pin 30.

Second, the inner cavity is provided at the proximal end of the fixed arm 11, the movable arms 12 and the fixed arm 11 clamp and are closed, the proximal end of each movable arm 12 is folded in the inner cavity, and the elastic sheet 121 provided at the proximal ends of the movable arms 12 abuts against the releasing member 20. After the clamping operation is completed at the distal end, the releasing member 20 is separated from the sliding pin 30, the releasing member 20 is withdrawn from the proximal end, at this time, the elastic sheet 121 can release part of the accumulated elastic potential energy in the space where the releasing member 20 is withdrawn, and elastically abuts against the inner wall of the inner cavity. In the above, in the embodiments of the present disclosure, the manner of providing the inner cavity is not specifically limited, for example, it may be as shown in FIG. 1, in which the inner cavity is located between the fixed arm 11 and the clamp holder 13 provided at the proximal end of the fixed arm 11, wherein the clamp holder 13 may be fixedly connected to the proximal end of the fixed arm 11, or may be integrally formed with the fixed arm 11, or the fixed arm 11 itself may include an inner cavity at the proximal end formed by an extended structure.

An embodiment of the present disclosure provides a three-arm clamp, including a clamping assembly 10 and a releasing member 20 connected to each other, the clamping assembly 10 includes a fixed arm 11 and two movable arms 12 respectively rotatably connected to the fixed arm 11 through a hinge pin 101, a first sliding slot 120 is provided at the proximal end of each movable arm 12, and a sliding pin 30 is slidably provided in the first sliding slot 120, an inner cavity is formed at a proximal end of the fixed arm 11, the releasing member 20 is inserted into the inner cavity and connected to the sliding pin 30, and the releasing member 20 continues to be pushed towards a distal end along a direction in which the releasing member 20 is inserted, each movable arm 12 is driven to rotate with the hinge pin 101 as a center through the movement of the sliding pin 30 along with the releasing member 20 towards the distal end and the sliding of the sliding pin 30 in the first sliding slot 120, and the distal end of the movable arm 12 is opened relative to the fixed arm 11. After a target object is confirmed, the releasing member 20 is pulled towards the proximal direction, and the sliding pin 30 moves towards the proximal direction along with the releasing member 20 and slides in the first sliding slot 120, to drive the movable arms 12 to rotate, and the distal ends of the movable arms 12 are closed towards the fixed arm 11 so as to clamp the target object. An elastic sheet 121 is further provided at the proximal ends of the movable arms 12, and when the movable arms 12 are rotated along the hinge pin 101 to clamp and be closed with the fixed arm 11, the elastic sheet 121 is gradually folded in the inner cavity and abuts against the releasing member 20; in the above, as the distal ends of the movable arms 12 approach the fixed arm 11, a connecting end of the elastic sheet 121 first enters the inner cavity until the distal ends of the movable arms 12 clamp and are closed with the fixed arm 11, the free end of the elastic sheet 121 also completely enters the inner cavity, and the free end of the elastic sheet 121 abuts against a surface of the releasing member 20. After the movable arms 12 at two sides are respectively controlled to clamp the target object, the releasing member 20 is separated from the sliding pin 30, the releasing member 20 can be folded through the proximal end, the free end of the elastic sheet 121 is separated from the abutment against the surface of the releasing member 20, and after releasing part of accumulated elastic potential energy, elastically abuts against the inner wall of the inner cavity. The elastic abutment of the elastic sheet 121 against the inner wall of the inner cavity effectively ensures stability of clamping and fixing between the fixed arm 11 and the movable arms 12 in the part of the clamping assembly 10 left in the body after the operation is completed.

Optionally, in conjunction with FIG. 1 and FIG. 2, a clamp holder 13 is provided at the proximal end of the fixed arm 11, the inner cavity is formed between the clamp holder 13 and the fixed arm 11, the releasing member 20 is separated from the movable arms 12, and the free end of the elastic sheet 121 elastically abuts against the inner wall of the clamp holder 13.

As shown in FIG. 1, the clamp holder 13 is provided at the proximal end of the fixed arm 11, wherein the clamp holder 13 may be integrally molded and connected to the fixed arm 11, alternatively, the clamp holder 13 also may be fixedly connected to the fixed arm 11 in other manners, and the inner cavity is formed between the clamp holder 13 and the fixed arm 11, in this way, the size of the inner cavity can be correspondingly adjusted according to the dimension of the clamp holder 13, and has the designability in a certain range, furthermore, as the inner cavity is formed between the clamp holder 13 and the fixed arm 11, the inner wall of the clamp holder 13 can serve as the inner wall of the inner cavity, is configured to elastically abut against the free end of the elastic sheet 121, and fully utilizes the existing structure features, so that the three-arm clamp of the embodiments of the present disclosure has a compact structure, and has a high space utilization rate.

In the following description, a specific structure and operation mode will be described with reference to the accompanying drawings, in which the clamp holder 13 is provided at the proximal end of the fixed arm 11, and the inner cavity is formed between the fixed arm 11 and the clamp holder 13.

Alternatively, referring to FIG. 1 and FIG. 3 in combination, the elastic sheet 121 is perpendicular to a longitudinal direction of the movable arms 12, the elastic sheet 121 has one end connected to the proximal end of the movable arm 12, and the other end rises upwards towards a side away from the fixed arm 11 in the free state, and when the movable arms 12 are rotated along the hinge pin 101 to clamp and be closed with the fixed arm 11, the elastic sheet 121 is folded in the inner cavity of the clamp holder 13 along a radial direction of the clamp holder 13 and abuts against the releasing member 20.

As shown in FIG. 1, an extending direction of the elastic sheet 121 is approximately perpendicular to a longitudinal direction when the movable arms 12 are in the closed state, therefore, then when the movable arms 12 are closed to make the elastic sheet 121 to be gradually folded in the inner cavity, the process in which the elastic sheet 121 abuts against the releasing member 20 gradually abuts and slides in a direction indicated by an arrow in FIG. 2, in this way, on the one hand, in the whole process that the elastic sheet 121 abuts against the releasing member 20, the elastic sheet 121 is always in contact with the releasing member 20 with the smallest width, so that a friction force between the two is as small as possible, thus the operation is labor-saving and smooth; on the other hand, it also effectively avoids the problem that when the elastic sheet 121 enters and exits in a manner of having friction with the releasing member 20 at a certain angle, direct contact between an edge of the elastic sheet 121 and an edge of the releasing member 20 possibly causes serious abrasion or jamming therebetween.

Figure 4:
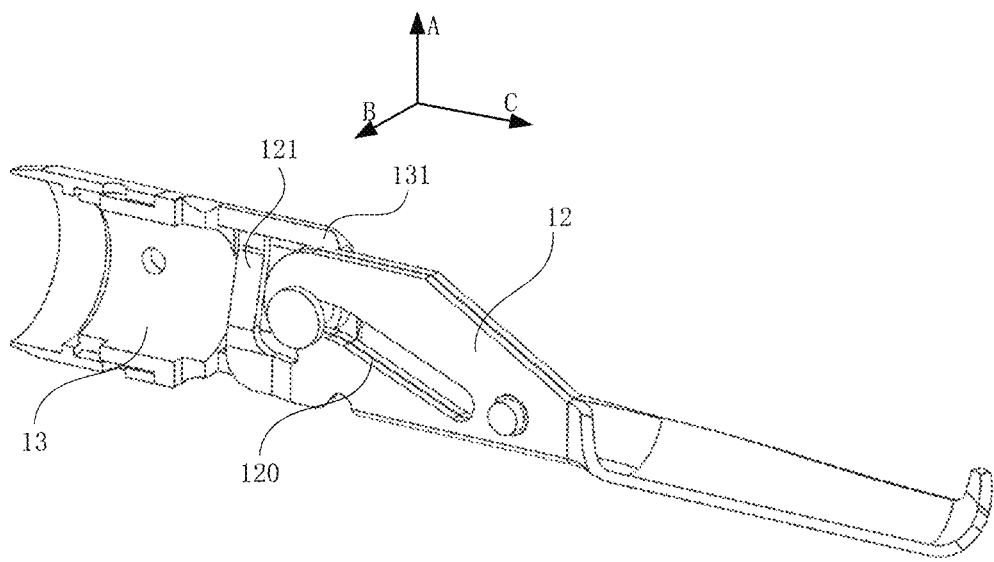
FIG. 4 is a sectional schematic view of the three-arm clamp provided in an embodiment of the present disclosure.

FIG. 4 is a sectional view of FIG. 1 from another perspective. Optionally, as shown in FIG. 4, a locking portion 131 extending inwards is formed on an outer edge of the clamp holder 13, and an extending direction of the locking portion 131 is a direction shown by an arrow B of a coordinate axis in FIG. 4, the releasing member 20 is separated from the movable arms 12 (the releasing member 20 is withdrawn in a direction opposite to an arrow C in FIG. 4), the elastic sheet 121 releases part of the accumulated elastic potential energy to spring towards the direction of the clamp holder 13 (i.e., a direction opposite to arrow B in FIG. 4), until the free end of the elastic sheet 121 abuts against the locking portion 131, the movable arms 12 need to be rotated to open, and the free end of the elastic sheet 121 needs to move in a direction of an arrow A in FIG. 4, the free end of the elastic sheet 121 elastically abuts against the locking portion 131, and the locking portion 131 limits the movement of the elastic sheet 121 by being perpendicular to a movement direction of the elastic sheet 121, thus ensuring the locking of a clamping position of the elastic sheet 121.

Figure 5:
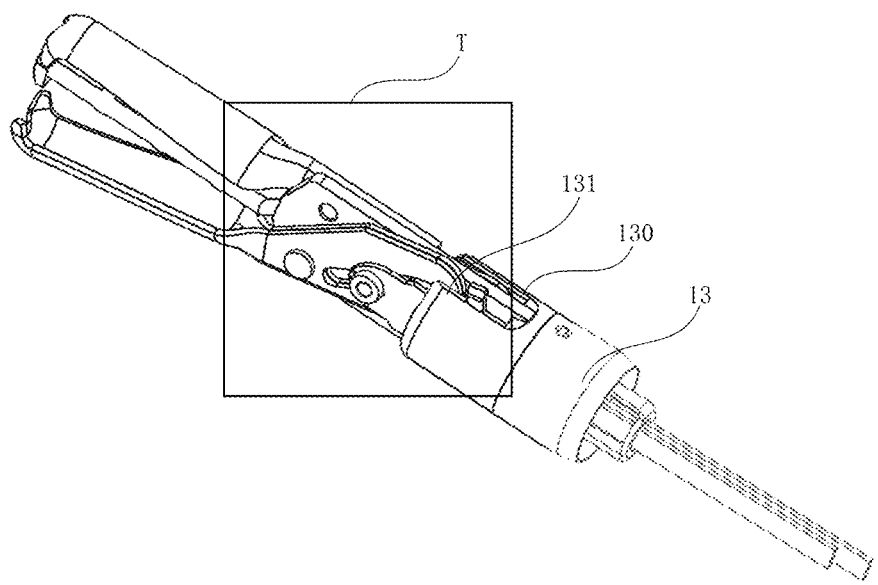
FIG. 5 is a third structural schematic view of the three-arm clamp provided in an embodiment of the present disclosure.

Optionally, as shown in FIG. 5, the clamp holder 13 is of a cylindrical structure, a slot 130 for the movable arms 12 to pass through is formed on the clamp holder 13, and the locking portion 131 is formed on a side wall of the slot 130.

The clamp holder 13 of a cylindrical structure has a smooth and rounded outer circumference, so that the three-arm clamp of the embodiments of the present disclosure, in the process of being extended into a wounded part in the body and moved to operate, avoids scratches that may be caused by edges and corners to human tissues, and the clamp holder 13 of a cylindrical structure also can protect the fixed arm 11 and the movable arms 12 located in the inner cavity thereof. When the clamp holder 13 is of a cylindrical structure, in order to ensure that the movable arms 12 can smoothly enter and exit the inner cavity of the clamp holder 13 while rotating, the slot 130 needs to be preset at a position of the clamp holder 13 where the movable arms 12 enter and exit, so as to avoid an interference on the movement of the movable arms 12, and in this case, the locking portion 131 can be formed at a position of a side wall of the slot 130 on the clamp holder 13, or in other words, the side wall of the slot 130 on the cylindrical clamp holder 13 is directly used as the holding portion, so that no additional locking portion 131 needs to be provided on the clamp holder 13.

Without doubt, it should be noted that the length of the clamp holder 13, the position, size, dimension and etc. of the slot 130 formed on the clamp holder 13 are not specifically limited in the embodiments of the present disclosure, and may be correspondingly set and selected according to the structure and movement requirements of the movable arms 12 in the three-arm clamp.

Figure 6A:
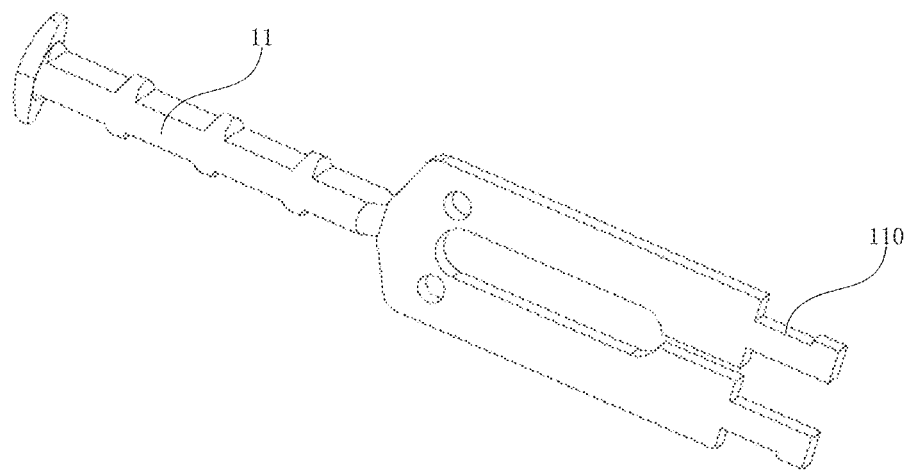
FIG. 6a and FIG. 6b are structural schematic views of a fixed arm of the three-arm clamp provided in an embodiment of the present disclosure.
Figure 6B:
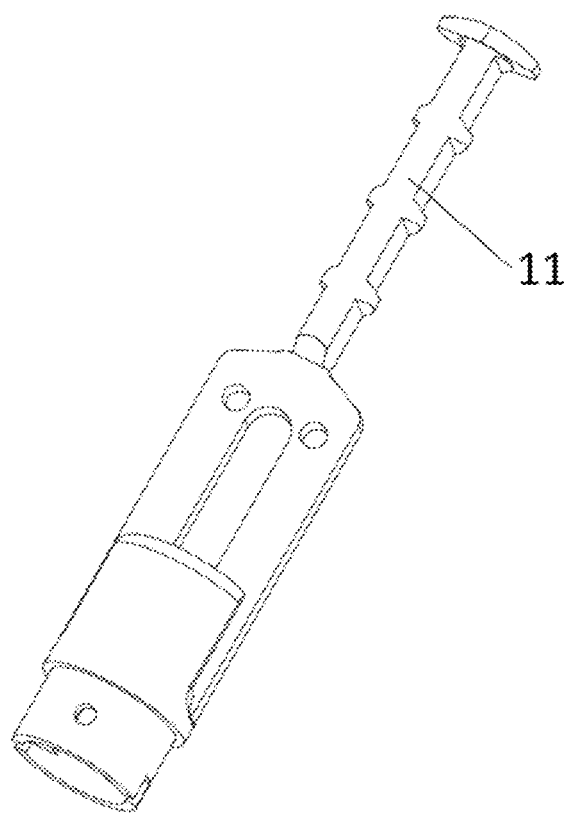

FIG. 6a and FIG. 6b are structural schematic views of the fixed arm 11 of the three-arm clamp in an embodiment of the present disclosure. Optionally, as shown in FIG. 6a and FIG. 6b in combination with FIG. 5, grooves 110 are formed at two sides of the proximal end of the fixed arm 11, a clamp holder 13 is further provided at the proximal end of the fixed arm 11, the inner cavity is formed between the clamp holder 13 and the fixed arm 11, and the clamp holder 13 is connected with the fixed arm 11 through the grooves 110.

The clamp holder 13 is clamped and fixed at the proximal end of the fixed arm 11 by means of the grooves 110, which, on the basis of ensuring the clamping stability, fully utilizes spaces of existing structures, and reduces an outer diameter of the clamp holder 13 without affecting the structure and smooth operation, so that the three-arm clamp of the embodiments of the present disclosure has a compact structure.

Figure 7:
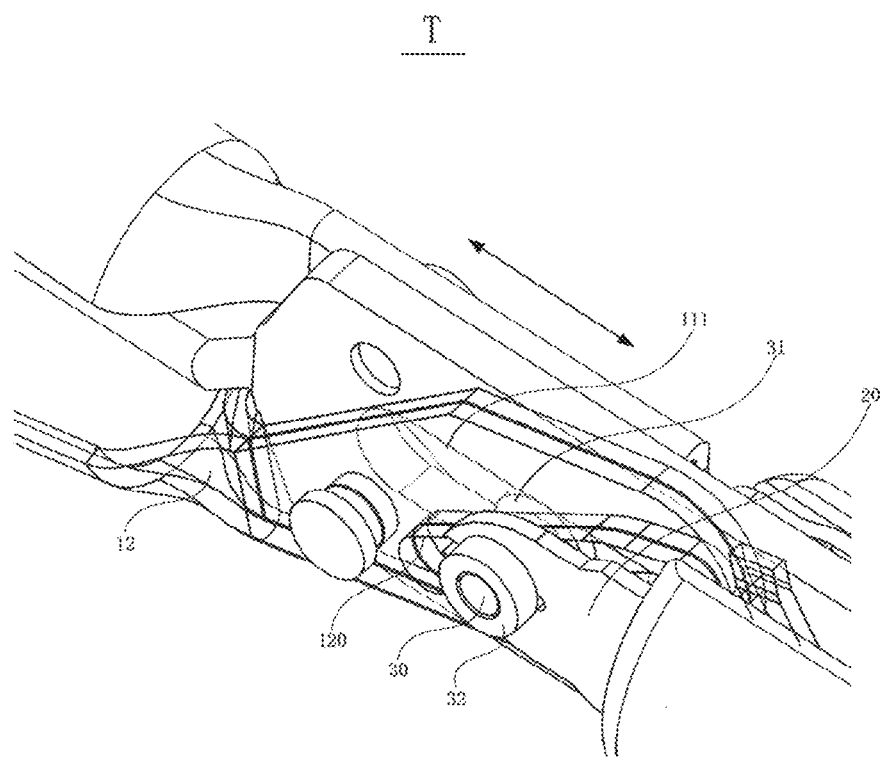
FIG. 7 is a partial enlarged view of a region T in FIG. 5.

Optionally, as shown in FIG. 6a and FIG. 6b, a second sliding slot 111 is provided on the fixed arm 11, and the second sliding slot 111 is a strip-shaped slot. FIG. 7 is a partial enlarged view of a region T in FIG. 5. Referring to FIG. 7 again, a longitudinal direction (indicated by a bidirectional arrow in FIG. 7) of the second sliding slot 111 is the same as a movement direction of the releasing member 20, the sliding pin 30 is provided to extend into the second sliding slot 111 and slides in the second sliding slot 111, and the second sliding slot 111 can guide the movement of the sliding pin 30, avoiding possible lateral bouncing or motion offset when the sliding pin 30 is pushed and pulled to move only by the releasing member 20.

It should be noted that the second sliding slot 111 being a strip-shaped slot means that the second sliding slot 111 may be a straight-strip-shaped slot as shown in FIG. 7, and it also includes the case that the second sliding slot is processed into a slot similar to a straight strip due to processing errors or special operation requirements, as long as the second sliding slot 111 can guide the movement of the sliding pin 30.

Moreover, while sliding in the second sliding slot 111, the sliding pin 30 also slides in the first sliding slot 120 and drives the opening and closing movement of the movable arms 12. It can be seen from FIG. 4 that the first sliding slot 120 includes an arc-shaped section and a tail section in communication with each other. As shown in FIG. 7, the first sliding slot 120 and the second sliding slot 111 form a wedge relationship during the movement, so that it is more labor-saving to pull the sliding pin 30 through the releasing member 20 to control the opening and closing of the movable arms 12.

The first sliding slot 120 includes the arc-shaped section and the tail section in communication with each other, and when the sliding pin 30 moves in position in the arc-shaped section of the first sliding slot 120, the movable arms 12 are rotated relative to the hinge pin 101, so that the distal ends of the movable arms 12 and the fixed arm 11 are opened and closed, when the sliding pin 30 moves to a terminal end of the arc-shaped section, the distal ends of the movable arms 12 have been closed and clamped with the fixed arm 11, in this case, the tail section of the first sliding slot 120 overlaps with an extending direction of the second sliding slot 111, the releasing member 20 is further pulled, so that when the sliding pin 30 enters the terminal end of the tail section, the releasing member 20 and the sliding pin 30 can be separated from each other, meanwhile, the clamping and closed relationship between the movable arms 12 and the fixed arm 11 is locked by limiting a position of an elastic section of the elastic sheet 121.

Optionally, as shown in FIG. 7, a sliding pin cap 31 is provided at one end of the sliding pin 30 located in the second sliding slot 111, the diameter of the sliding pin cap 31 is matched with the width of the second sliding slot 111 so as to slide in the second sliding slot 111, and the sliding pin 30 slides in the first sliding slot 120. The width of the second sliding slot 111 is greater than that of the first sliding slot 120.

In this way, the sliding pin cap 31 that fits and slides in the second sliding slot 111 cannot axially penetrate through the first sliding slot 120 due to a larger plane width thereof, thus providing structural limitation for an axial movement of the sliding pin 30, and improving the movement stability of the sliding pin 30.

Figure 8A:
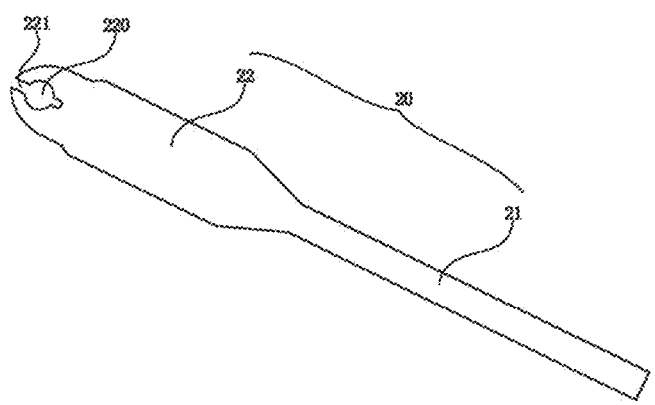
FIG. 8a is a first structural schematic view of a releasing member of the three-arm clamp provided in an embodiment of the present disclosure.

Optionally, as shown in FIG. 8a, the releasing member 20 includes a releasing lever 21 and a releasing portion 22 connected to a distal end of the releasing lever 21, a connection hole 220 is formed in the releasing portion 22, a detachment portion 221 is formed between the connection hole 220 and the distal end of the releasing portion 22, the releasing member 20 is connected to the sliding pin 30 through the connection hole 220, the width of the detachment portion 221 is less than an axial diameter of the sliding pin 30, and the releasing member 20 is located at one side of the movable arms 12 away from the fixed arm 11.

Hooked structures are usually adopted in the prior art, so as to ensure that the clamping state of the clamping assembly 10 is locked after the releasing member 20 is separated. However, as the operating action of the releasing member 20 is a linear movement, to realize stable hooking, the hooked structures can only adopt structures perpendicular to the straight line direction, then to realize the hooked state by the action of the releasing member 20, the releasing member 20 also must be moved laterally, which will result in an increased lateral dimension of the whole structure of the device.

As shown in FIG. 7, after the two movable arms 12 of the clamping assembly 10 both accurately clamp and are closed with the fixed arm 11, by directly pulling the releasing member 20 continuously, the sliding pin 30 can be detached from the connection hole 220 through the detachment portion 221, thus the releasing member 20 is separated. The process of separating the releasing member 20 only requires withdrawing the releasing member 20 towards the proximal direction along the movement direction of the releasing member 20 without any lateral operation, thus saving the lateral dimension space of the three-arm clamp of the embodiments of the present disclosure, and facilitating the miniaturization and compact design of the body structure of the three-arm clamp.

It should be noted that, for the three-arm clamp of the embodiments of the present disclosure, the structure form of the detachment portion 221 is not specifically limited, as long as the releasing member 20 can be further pulled towards the proximal direction, so that the releasing member 20 can be detached from the connection hole 220 through the detachment portion 221. Several forms of the detachment portion 221 will be exemplified below with reference to the FIGS. 8a-8d, respectively.

Exemplarily, as shown in FIG. 8a, the detachment portion 221 may be a notch structure formed on a side of the releasing member 20 opposite to the connection hole 220, the width of the notch structure is less than the diameter of the sliding pin 30, and when the releasing member 20 is operated normally, the releasing member 20 will not be detached from the sliding pin 30 through the notch structure, and in the process of further pulling the releasing member 20 to make the same to be separated from the sliding pin 30, the notch structure is elastically deformed to a certain extent, so that it is more labor-saving detach the sliding pin 30 from the notch structure, and damage caused by rigid tearing at a distal end position of the releasing member 20 is avoided.

Figure 8B:
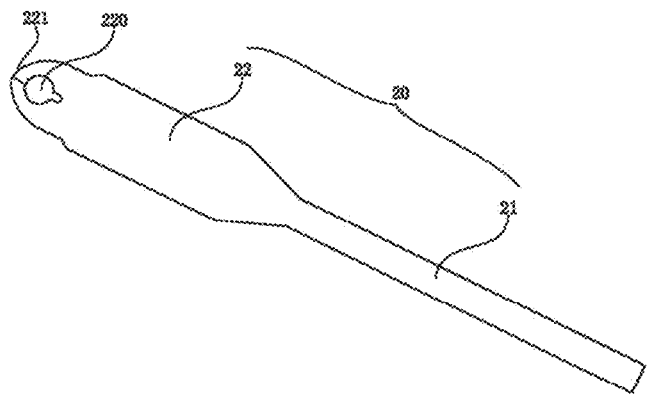
FIG. 8b is a second structural schematic view of the releasing member of the three-arm clamp provided in an embodiment of the present disclosure.

Exemplarily, as shown in FIG. 8b, the detachment portion 221 may be a split structure formed on a side of the releasing member 20 opposite to the connection hole 220, that is, at the position where the split structure is located, a part originally forming an outer wall of the connection hole 220 is cut in a linear direction, in this way, when an external force is applied, two parts which are cut in the linear direction can be separated from each other, and when the releasing member 20 is operated normally, the split structure is subjected to a smaller external force, and the releasing member 20 will not be detached from the sliding pin 30 through the split structure. In the process of further pulling the releasing member 20 to make the same to be separated from the sliding pin 30, the split structure is subjected to a sufficient external force to be elastically deformed to a certain extent, thus making it labor-saving for the sliding pin 30 to be detached from the split structure, and avoiding damage caused by rigid tearing at the distal end position of the releasing member 20.

Figure 8C:
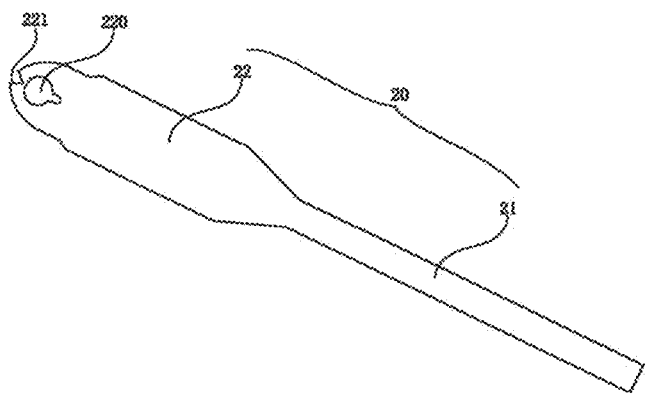
FIG. 8c is a third structural schematic view of the releasing member of the three-arm clamp provided in an embodiment of the present disclosure.
Figure 8D:
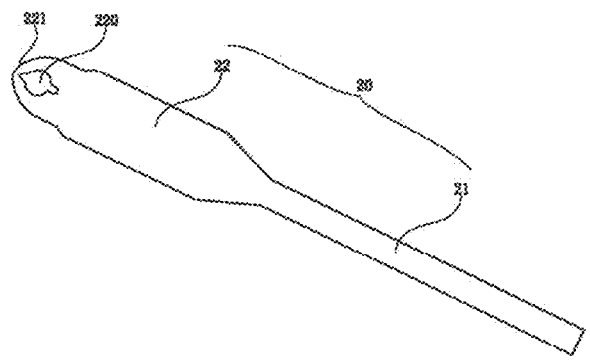
FIG. 8d is a fourth structural schematic view of the releasing member of the three-arm clamp provided in an embodiment of the present disclosure.

Exemplarily, as shown in FIG. 8c and FIG. 8d, the releasing member 20 also may be made of a material with small disconnection strength, or the detachment portion 221 of the releasing member 20 is provided to be thinner than other positions.

The detachment portion 221 may be a V-shaped notch formed on a side of the releasing member 20 opposite to the connection hole 220, wherein opening directions of V-shaped notches shown in FIG. 8c and FIG. 8d are opposite. By providing the V-shaped notch, guiding structures capable of being separated from each other by force are formed between the connection hole 220 and the distal end of the releasing portion 22, but the V-shaped notch is not disconnected from the connection hole 220, in this way, when the releasing member 20 is operated normally, an external force applied to the V-shaped notch is relatively small, and the V-shaped notch will not adversely affect the operation strength of the releasing member 20. In the process of further pulling the releasing member 20 to be separated from the sliding pin 30, due to the smaller strength that the material of the detachment portion 221 can withstand, or due to the relatively small thickness provided, the position of the detachment portion 221 can be made to be subjected to force first, and due to the configuration of the V-shaped notch, the thickness at the position of the V-shaped notch is minimized, so as to guide a disconnection position to the V-shaped notch, and under a tensile force of appropriate strength, disconnection occurs at the thinnest position between the connection hole 220 and the V-shaped notch, so that it is labor-saving when making the sliding pin 30 to be detached from the V-shaped notch, and avoiding damage caused by rigid tearing at the distal end position of the releasing member 20.

On the basis of providing the sliding pin cap 31 on the sliding pin 30 in the above, optionally, as shown in FIG. 7, a sliding pin sleeve 32 is further fixedly provided on the sliding pin 30, and a diameter of the sliding pin sleeve 32 is greater than an aperture of the connection hole on the releasing portion 22. The releasing portion 22 can only move linearly along the longitudinal direction of the second sliding slot 111 during the movement process. Due to the guiding effect of the second sliding slot 111, the releasing portion 22 will not swing laterally. Due to the limitation of the sliding pin sleeve 32 and the sliding pin cap 31, the releasing portion 22 will not be axially displaced, therefore, the movement stability of the releasing member 20 can be effectively improved, thus ensuring that the operation process of the three-arm clamp of the embodiments of the present disclosure is accurately controlled.

In addition, as shown in FIG. 6a and FIG. 6b, the second sliding slot 111 is provided at the proximal end of the fixed arm 11, a terminal end of the proximal end of the second sliding slot 111 is provided with a slot in communication with the second sliding slot 111, in this way, by applying a relative force to two sides for providing the clamp holder 13 at the proximal end of the fixed arm 11, the two sides can be elastically deformed and are relatively close to each other, thus the clamp holder 13 can be elastically fitted and sleeved in the groove directly from the proximal end of the fixed arm 11, so that the assembly of the clamp holder 13 is convenient and quick.

Figure 9:
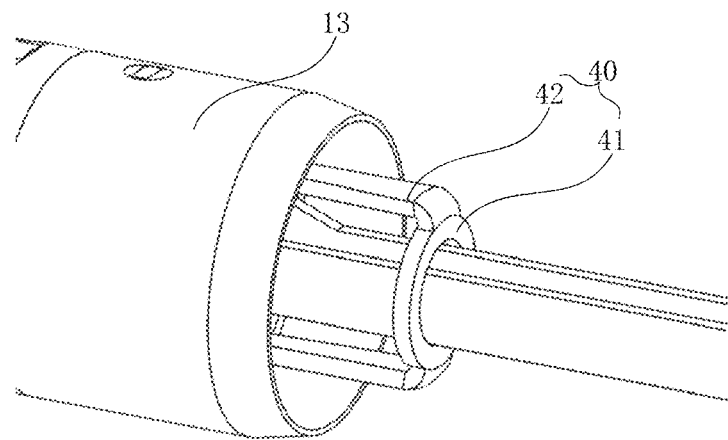
FIG. 9 is a partial structural view of the three-arm clamp, including a retainer, provided in an embodiment of the present disclosure.
Figure 10:
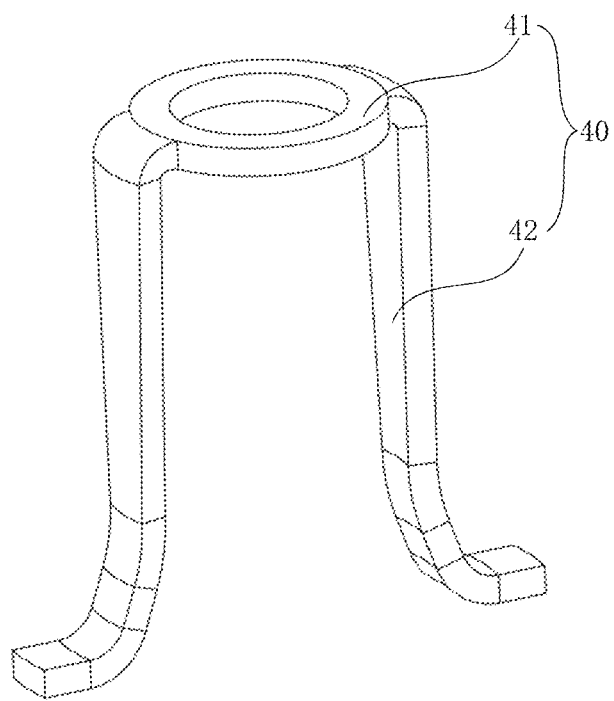
FIG. 10 is a structural schematic view of the retainer of the three-arm clamp provided in an embodiment of the present disclosure.

Optionally, as shown in FIG. 9 and FIG. 10, a retainer 40 is further clamped in the clamp holder 13, and the retainer 40 includes an annular portion 41 and at least two claws 42 extending outwards from the annular portion 41, the claws 42 are elastically coupled with the clamp holder 13, the proximal end of the releasing member 20 is inserted into the annular portion 41, and in an operating process of controlling the movable arms 12 and the fixed arm 11 of the clamping assembly 10 to be opened and closed with each other through the releasing member 20 so as to clamp a target object, the two releasing members 20 respectively controlling the movable arms 12 at two sides both have a telescopic movement in the annular portion 41, and the annular portion 41 can restrict a movement direction of the releasing members 20, so that the releasing members 20 have better straightness during the movement, and after the clamping of the target object is completed, the releasing members 20 separated from the movable arms 12 are retracted towards the proximal direction, and the separation of the releasing members 20 from the movable arms 12 can drive the retainer 40 to be retracted together with the releasing members 20.

Exemplarily, as shown in FIG. 8a, taking the releasing member 20 being of a structure including the releasing lever 21 and the releasing portion 22 connected to the distal end of the releasing lever 21 as an example, with reference to FIG. 9 again, the width of the releasing portion 22 is generally set to be greater than the inner diameter of the annular portion 41, in this way, as the width of the releasing portion 22 is greater than the inner diameter of the annular portion 41, in the process of retracting the releasing member 20, the claws 42 of the retainer 40 can be driven to separate from the elastic coupling with the clamp holder 13, and retracted together with the releasing member 20.

Figure 11:
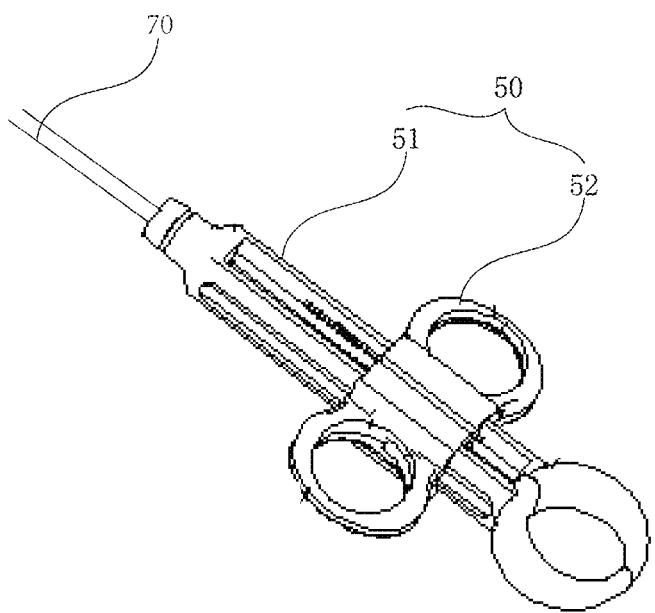
FIG. 11 is a structural schematic view of a handle assembly of the three-arm clamp provided in an embodiment of the present disclosure.

Alternatively, as shown in FIG. 11, the three-arm clamp of the embodiments of the present disclosure further includes a handle assembly 50, the handle assembly 50 includes a handle bracket 51 and two handle sliders 52 provided at two sides of the handle bracket 51 and respectively slidable on the handle bracket 51, the proximal end of the releasing member 20 is connected to an operating wire, and the two handle sliders 52 are correspondingly connected to proximal ends of the operating wires at the same side, respectively. When the three-arm clamp of the embodiments of the present disclosure is applied to endoscopic surgery, the handle assembly 50 is operated outside the body, and connected to the operation part entering the body through the operating wire 70 and controls operation, and after the clamping operation in the body is completed, a part at the distal end other than clamping assembly 10 is withdrawn from the body through the control of the handle assembly 50.

Figure 12:
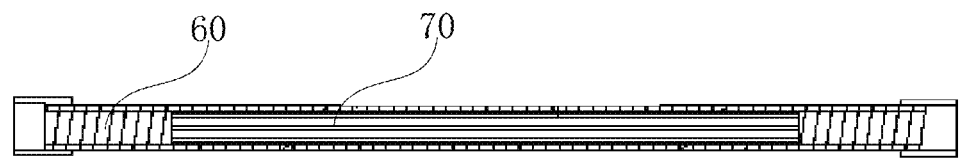
FIG. 12 is a structural schematic view of a spring tube of the three-arm clamp provided in an embodiment of the present disclosure.

Optionally, as shown in FIG. 12 in combination with FIG. 2, the proximal end of the clamp holder 13 is connected to one end of a spring tube 60, the other end of the spring tube 60 is connected to the handle bracket 51, and the operating wires 70 are provided in the spring tube 60. The spring tube 60 itself has a certain flexible telescopic and bending capability, and by guiding the introduction or extraction of the operating wires 70 into or out of the body through the spring tube 60, the operation difficulty can be reduced, and the spring tube 60 can protect the operating wires 70.

Exemplarily, the proximal end of the clamp holder 13 and a distal end of the spring tube 60 are separately provided with a clamping hole corresponding to each other, and the claws 42 of the retainer 40 respectively pass through the clamping holes of the clamp holder 13 and the spring tube 60 to clamp and fix the clamp holder 13 and the spring tube 60 together. As shown in FIG. 9, when the three-arm clamp of the embodiments of the present disclosure further includes the spring tube 60 (not shown in FIG. 9), the spring tube 60 is sleeved on the proximal end of the releasing member 20 and the outside of the operating wires 70 (not shown in FIG. 9). In endoscopic surgery, a doctor holds the handle assembly 50 to operate outside the body, which is connected to an operation part (the releasing member 20) entering the body through the operating wires 70 to control the operation. After the clamping operation in the body is completed, the doctor further pulls the operating wires 70 by controlling the handle assembly 50, so as to drive the releasing member 20 to be separated from the movable arms 12. The width of the releasing portion 22 of the releasing member 20 is greater than the inner diameter of the annular portion 41. In the process that the releasing member 20 moves towards the proximal direction, the releasing portion 22 pulls the retainer 40 to move towards the proximal direction. The claws 42, having certain elasticity, is gradually detached from the clamping holes of the clamp holder 13 and the spring tube 60 and separated and retracted together with the releasing member 20 under the action of a pulling force, at this time, the spring tube 60 is also separated from the clamping with the clamp holder 13, and also can be separated and retracted together, so that the parts of the three-arm clamp of the embodiments of the present disclosure, other than the distal clamping assembly 10, are withdrawn together to the outside of the body.

The above-mentioned are merely for preferred embodiments of the present disclosure and not intended to limit the present disclosure. For one skilled in the art, various modifications and variations may be made to the present disclosure. Any modifications, equivalent substitutions and/or improvements and the like made within the spirit and principle of the present disclosure are intended to be included within the scope of protection of the present disclosure.

The invention claimed is:

1. A three-arm clamp, comprising: a clamping assembly and a releasing member connected to each other, wherein the clamping assembly comprises a fixed arm and two movable arms respectively rotatably connected to the fixed arm through a hinge pin, a first sliding slot is provided at a proximal end of each movable arm, a sliding pin is slidably provided in the first sliding slot, an inner cavity is formed at a proximal end of the fixed arm, the releasing member is inserted into the inner cavity and connected to the sliding pin, an elastic sheet is further provided at the proximal end of each of the movable arms; when the movable arms clamp and are closed with the fixed arm, the elastic sheet is folded in the inner cavity and abuts against the releasing member along a radial direction of the fixed arm from a connecting end to a free end; and the releasing member is separated from the movable arms, and the free end of the elastic sheet elastically abuts against an inner wall of the inner cavity, wherein a clamp holder is further provided at the proximal end of the fixed arm, the inner cavity is formed between the clamp holder and the fixed arm and inside the clamp holder, the releasing member is detachable from the movable arms, and the free end of the elastic sheet elastically abuts against an inner wall of the clamp holder.

2. The three-arm clamp according to claim 1, wherein a locking portion extending inwards is formed on an outer edge of the clamp holder, the locking portion extends inwards from an external surface of the outer edge of the clamp holder, the releasing member is separated from connection with the movable arms, and the free end of the elastic sheet abuts against the locking portion.

3. The three-arm clamp according to claim 2, wherein the clamp holder is of a cylindrical structure, a slot for the movable arms to pass through is formed on the clamp holder, and the locking portion is formed on a side wall of the slot.

4. The three-arm clamp according to claim 1, wherein a second sliding slot is provided on the fixed arm, the second sliding slot is a strip-shaped slot and different from the first sliding slot, a longitudinal direction of the second sliding slot is the same as a movement direction of the releasing member, the sliding pin is provided to extend into the second sliding slot and slides in the second sliding slot.

5. The three-arm clamp according to claim 4, wherein a sliding pin cap is provided at one end of the sliding pin located in the second sliding slot, and a diameter of the sliding pin cap is matched with a width of the second sliding slot so as to slide in the second sliding slot.

6. The three-arm clamp according to claim 1, wherein the releasing member comprises a releasing lever and a releasing portion connected to a distal end of the releasing lever, a connection hole is formed in the releasing portion, a detachment portion is formed between the connection hole and a distal end of the releasing portion, the releasing member is connected to the sliding pin through the connection hole, and the releasing member is located at one side of the movable arms away from the fixed arm.

7. The three-arm clamp according to claim 6, wherein a sliding pin sleeve is fixedly provided on the sliding pin, and a diameter of the sliding pin sleeve is greater than a diameter of an aperture of the connection hole on the releasing portion.

8. The three-arm clamp according to claim 1, wherein a retainer is further partly coupled in the clamp holder, the retainer comprises an annular portion and at least two claws extending outwards from the annular portion, the claws are elastically coupled with the inner wall of the inner cavity, a proximal end of the releasing member is inserted into the annular portion, the releasing member separating from the movable arms can drive the retainer to be separated and retracted.

9. The three-arm clamp according to claim 1, further comprising a handle assembly, wherein the handle assembly comprises a handle bracket and two handle sliders, which are provided at two sides of the handle bracket and respectively slidable on the handle bracket, a proximal end of the releasing member is connected to an operating wire, and the two handle sliders each are correspondingly connected to a proximal end of the operating wire at the same side.

10. The three-arm clamp according to claim 9, wherein the proximal end of the fixed arm is connected to one end of a spring tube, the other end of the spring tube is connected to the handle bracket, and the operating wire is provided in the spring tube.

11. The three-arm clamp according to claim 2, wherein a second sliding slot is provided on the fixed arm, the second sliding slot is a strip-shaped slot and different from the first sliding slot, a longitudinal direction of the second sliding slot is the same as a movement direction of the releasing member, the sliding pin is provided to extend into the second sliding slot and slides in the second sliding slot.

12. The three-arm clamp according to claim 3, wherein a second sliding slot is provided on the fixed arm, the second sliding slot is a strip-shaped slot and different from the first sliding slot, a longitudinal direction of the second sliding slot is the same as a movement direction of the releasing member, the sliding pin is provided to extend into the second sliding slot and slides in the second sliding slot.

* * * * *